United States Patent [19]

Olmr

[11] Patent Number: 5,775,077
[45] Date of Patent: Jul. 7, 1998

[54] LAWNMOWING APPARATUS HAVING GRASS COLLECTOR FULLNESS DETECTOR WITH ELASTIC MEMBRANE

[76] Inventor: Jaroslav O. Olmr, 2919 N. 8th St., Sheboygan, Wis. 53083

[21] Appl. No.: 655,855

[22] Filed: May 31, 1996

[51] Int. Cl.$^6$ ...................................................... A01D 34/12
[52] U.S. Cl. ........................... 56/202; 56/194; 56/DIG. 8
[58] Field of Search ........................... 56/194, 199, 200, 56/201, 202, 203, 10.2 R, 28, 30

[56] References Cited

U.S. PATENT DOCUMENTS

| | | | |
|---|---|---|---|
| 2,698,929 | 1/1955 | Greacen et al. | 340/239 |
| 3,863,428 | 2/1975 | Baxter | 56/10.2 R |
| 3,971,198 | 7/1976 | Lane | 56/202 |
| 4,635,047 | 1/1987 | Fox et al. | 56/30 X |
| 4,782,650 | 11/1988 | Walker | 56/10.2 R X |
| 4,964,266 | 10/1990 | Kolb | 56/202 |
| 5,321,939 | 6/1994 | Fuse et al. | 56/202 X |
| 5,388,394 | 2/1995 | Heismann | 56/194 |

FOREIGN PATENT DOCUMENTS 2 101 864  1/1983  United Kingdom .

*Primary Examiner*—Terry Lee Melius
*Assistant Examiner*—Robert Pezzuto
*Attorney, Agent, or Firm*—Burns, Doane, Swecker & Mathis, L.L.P.

[57] ABSTRACT

A lawnmower includes a grass collector bin connected to a rotary blade by a chute. Mounted on the chute is a pressure-sensitive detector which senses when the bin is full, on the basis of a given pressure increase in the chute. The detector includes a microswitch having a sensing arm which contacts a center portion of an elastic membrane. The membrane communicates with the chute such that the center portion of the membrane is deflected in response to a given pressure increase in the chute, in order to actuate the switch. The membrane includes a bellows portion for increasing the distance by which the membrane can be deflected in response to the given pressure increase.

11 Claims, 1 Drawing Sheet

LAWNMOWING APPARATUS HAVING GRASS COLLECTOR FULLNESS DETECTOR WITH ELASTIC MEMBRANE

RELATED INVENTION

This invention is related to that disclosed in the inventor's U.S. application Ser. No. 08/433,262, filed May 2, 1995, the disclosure of which is incorporated by reference herein.

1. Field of the Invention

This invention relates to power driven lawnmowers. It is particularly described in relation to a garden tractor lawnmower, but is not necessarily restricted thereto.

2. Background of the Invention

Power lawnmowers of the rotary blade type include a housing within which at least one cutting blade is mounted for rotation. Commonly, a grass collector is provided, and a chute connects the housing to the collector. Typically for a garden tractor arrangement, the chute may have a length of about one meter, and in the event that the collector is not emptied when full, the chute becomes blocked and is difficult to clear.

Various proposals have been made for the provision of indicators for the fullness of the collector. Thus, in accordance with one proposal, the collector is supported on one or more springs which deflect under the weight of the load. This proposal utilizes a normally OFF momentary contact switch, which contacts close under a predetermined load, and which serve to cut-off the ignition system of the mower.

In accordance with other proposals, optical or sound transducers or electrical resistance sensors are used which change the state of a switch responsive to blockage at the outlet of the chute, and the changed output is indicated either by the operation of an alarm or by changing the operation of the lawnmower, for example.

In British Application No. 2 101 864 there is disclosed a membrane which is mounted on a grass collector bag so as to be acted upon by pressure in the bag. As the bag becomes full, rising pressure therein causes the membrane to expand upwardly until indicia (e.g., the word "FULL") on the membrane becomes visible through a window.

In U.S. Pat. No. 5,388,394 a pressure-sensitive detector is disclosed as being mounted on a chute leading to a grass-collecting bag, and it is stated that a flap valve or a membrane can be provided as a member which is displaced by pressure in the chute.

A shortcoming of indicators of the type disclosed in the above-mentioned British application and U.S. patent is that unless the operator is attentive and periodically observes the detector, he/she may not become aware that the bag is full in time to prevent the chute from becoming blocked.

It is an objective of this invention to provide in a lawnmowing apparatus a simple inexpensive, and robust detector that is responsive to the state of fullness of the grass collector, and does not need to be monitored by the operator.

It is another object of this invention to provide such a detector that will not become clogged with grass or damaged by moisture, debris, etc.

SUMMARY OF THE INVENTION

The present invention relates to a lawnmower which includes a cutting chamber and a rotary cutter blade disposed therein. An air flow passage is provided through which grass cuttings are discharged from the cutting chamber in a current of air. A collector is connected to the air flow passage for accumulating the cuttings. A detector is provided which is responsive to an air pressure condition within the passage to change the state of the detector under a predetermined pressure condition related to the fullness of the collector. The detector includes an elastic membrane and a switch. The elastic membrane covers an opening arrangement formed in a wall of the passage to communicate one side of the membrane with pressure in the passage. The switch includes a sensing arm engageable with a second side of the membrane to be displaced thereby in response to pressure induced deflection of a region of the membrane contacted by the sensing arm. The membrane includes a bellows portion surrounding the contact region of the membrane, for increasing a displacement distance of the contact region of the membrane.

The membrane and bellows portion are preferably circular in shape.

The detector preferably includes a clamping plate clamping an outer periphery of the membrane against the wall of the passage.

The opening formed in the wall of the passage may comprise a single large opening, or a plurality of smaller openings, with the membrane being sized to cover all of the openings.

BRIEF DESCRIPTION OF THE DRAWINGS

The foregoing objects and aspects of the invention, together with other objects, aspects and advantages thereof will be more apparent from a consideration of the following description of the preferred embodiment thereof taken in conjunction with the drawings annexed hereto, wherein.

DETAILED DESCRIPTION OF THE PREFERRED EMBODIMENT OF THE INVENTION

Figure 1:
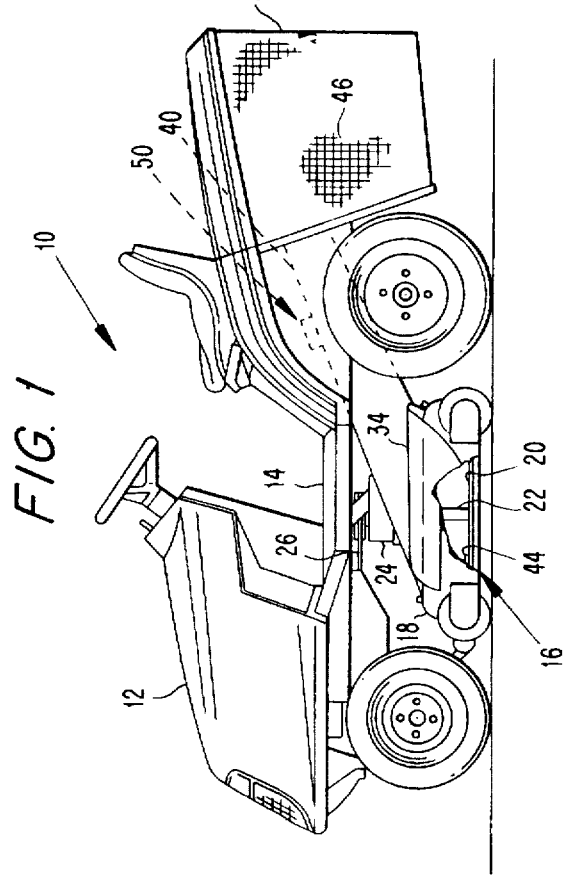
FIG. 1 shows a lawnmowing tractor in side elevation, partially broken away to reveal detail, with other hidden detail shown in dotted outline, incorporating a grass collector fullness detector in accordance with the invention.
Figure 2:
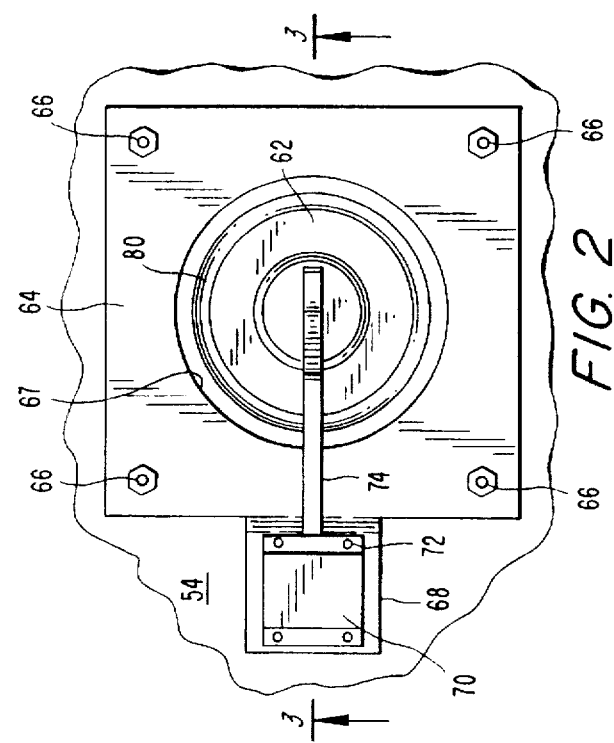
FIG. 2 shows in top plan view the detector according to the invention, with a top cover thereof removed.

In accordance with the invention, a riding mower 10 includes a tractor 12 having a chassis 14 and a mowing head 16 disposed beneath the chassis. The mowing head 16 includes a cutting chamber 18 with a cutting blade 20 therein mounted for rotation about a vertical shaft 22, which in its turn is coupled through an electromagnetic clutch 24 to the drive of tractor 12 by means of belt 26 or any other convenient means.

A grass collector bin 30 is disposed at the rear of tractor 12. An air passage 32, comprising an outlet 34 in cutting chamber 18 and a chute 40, connects between cutting chamber 18 and the collector bin. Cutting blade 20 has wings 46 upstanding thereon to generate a current of air which serves to impel grass cuttings through air passage 32 for collection in collector bin 30, the walls 46 of the latter being constructed of a foraminaceous material which permits the egress of air from the bin while retaining the cuttings within the bin. Typically, the velocity of the air within the chute 40 will be in the range of about 25 m/s to about 100 m/s. As thus far described, mower 10 is of a more or less conventional nature.

In accordance with the invention, a detector 50 is provided for detecting the state of fullness of collector bin 30.

The detector 50 includes a small baffle 52 which depends downwardly from the wall 54 of chute 40 over a portion of the periphery thereof to define an area of locally reduced cross-section within the chute, and a zone 56 within that area which is somewhat shielded from grass cuttings by the baffle. An opening 60 is provided in the wall 54 in the shielded zone 56.

Extending across the opening 60 is an elastic membrane 62 formed of rubber or plastic for example. An outer peripheral portion of the membrane 62 is clamped between an outer surface 54A of the wall 54 and a clamping plate 64, the wall and clamping plate 64 being secured together by bolts 66. The clamping plate 64 includes a circular center hole 67 aligned with the opening 60.

Figure 3:
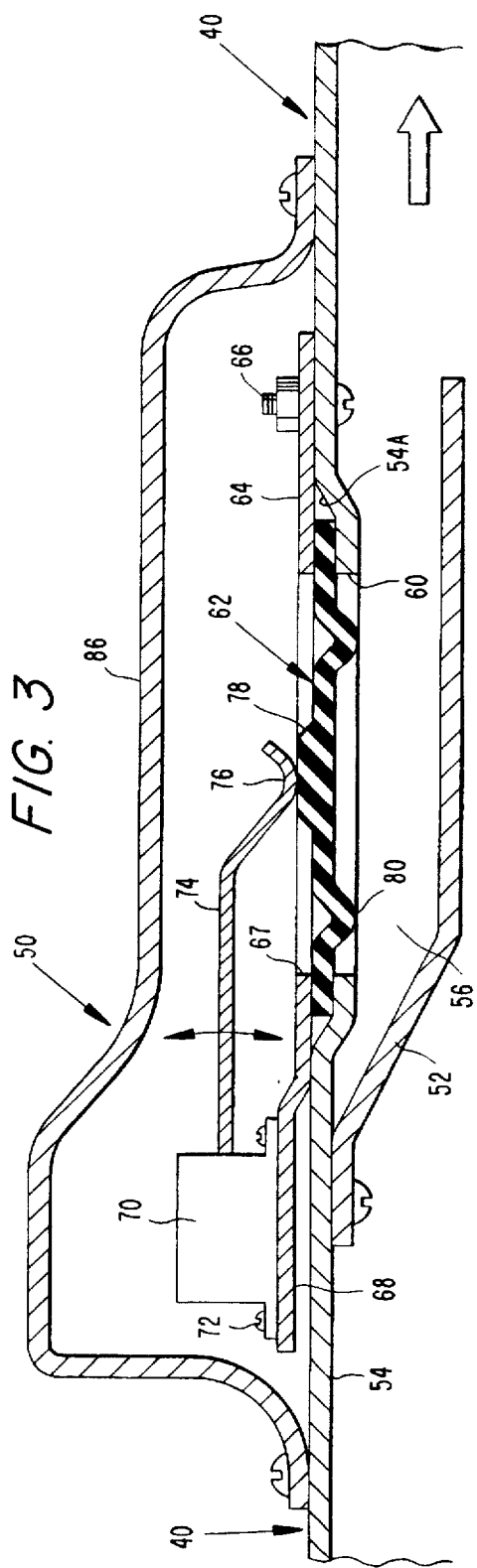
FIG. 3 is a sectional view taken along the line 3—3 in FIG. 2.

Mounted on a raised portion 68 of the clamping plate 64 is a microswitch 70, the microswitch being fastened by screws 72 to the clamping plate 64. The microswitch includes a pivoted sensing arm 74 having a vertically swingable free end 76 resting upon a thick central portion 78 of the membrane 62. The sensing arm is swingable between a lower or switch-open position shown in FIG. 3 to a raised or switch-closed (bin full) position (not shown) in response to a raising of the center of the membrane.

The membrane 62 is of circular shape and includes an annular pleated structure encircling the center portion 78 of the membrane and defining a bellows portion 80. The presence of the bellows portion 80 serves to increase the vertical distance by which the central portion 78 of the membrane can rise in response to a given pressure increase in the chute 40.

As a result, it is ensured that sufficient deflection of the membrane 62 can occur to close the microswitch in response to the given pressure increase without having to increase membrane flexibility by reducing the membrane thickness and thus making the membrane less robust. That is, a thick, durable, membrane 62 is provided which exhibits sufficient deflection per given pressure increase to close the microswitch.

Furthermore, the membrane 62 completely covers the opening 60 formed in the chute wall to prevent the possibility of grass clippings clogging the opening.

In lieu of a single, large opening 60, the wall 54 could be provided with a group of small openings, with the membrane overlying that group of openings.

A cover plate 86 is attached to the wall 54 to shield the microswitch 70 and membrane 62 from moisture and debris.

Considering now the operation of the detector 50, as the grass collector bin 30 fills, the resistance to the escape of air from the bin will increase, and the static pressure sensed at pressure sensing opening 60 will increase to a maximum indicative of the complete fullness of the bin. Pressure-actuated microswitch 70 may be set to change its state responsive to any desired condition of fullness of collector bin 30, but for most purposes, it will be preferred that this occurs when the bin is filled to or close to its maximum capacity. Under this condition, the rate of change of static pressure will tend to be a maximum, and the system will be less likely to be affected by variations in the cutting length and moisture content of the grass cuttings.

The increasing pressure acts against the underside of the membrane 62 to flex the center portion 78 of the membrane upwardly, thereby pushing the free end of the sensing arm 74 upwardly as well. Eventually, the center portion 78 is raised to such an extent that the sensing arm closes the microswitch. In response to the closing of the microswitch, certain actions can be produced, e.g., an alarm can be activated and/or the clutch 24 can be deactivated to terminate rotation of the cutting blade. Electric circuitry for performing those actions is disclosed in the inventor's earlier-mentioned application Ser. No. 08/433,262.

As a result of the presence of the bellows portion 80 of the membrane 62, the amount of deflection per pressure increase is enhanced, thereby making the detector 50 reliable without reducing its ruggedness. Also, the membrane 62 completely covers the opening 60 and thus prevents the opening from becoming clogged with grass. Those advantages are achieved by a relatively simple, inexpensive membrane structure.

It will be apparent that many changes may be made to the illustrative embodiment while falling within the scope of the invention, and it is intended that all such changes be covered by the claims appended hereto.

What is claimed is:

1. A lawnmower including:
   a cutting chamber and a rotary cutter blade therein;
   an air flow passage through which grass cuttings are discharged from said cutting chamber in a current of air;
   a collector connected to said passage for accumulating said grass cuttings; and
   a detector responsive to an air pressure condition within said passage to change a state of said detector under a predetermined pressure condition related to a fullness of said collector, said detector including:
      an elastic membrane covering an opening arrangement formed in a wall of said passage to communicate a first side of said membrane with pressure in said passage;
      a switch including a sensing arm engageable with a second side of said membrane to be displaced in response to pressure-induced deflection of a contact region of said membrane contacted by said sensing arm; and
      said membrane having formed therein a pleated structure surrounding said contact region and defining a bellows portion for increasing a displacement distance of said contact region of said membrane.

2. The lawnmower according to claim 1 further including an operator's seat, and a driven ground support wheel.

3. The lawnmower according to claim 1, wherein said membrane is circular, and said bellows portion is circular.

4. The lawnmower according to claim 1, wherein an outer portion of said membrane bears directly against an outer surface of said wall.

5. The lawnmower according to claim 4, said detector further including a clamping plate clamping an outer periphery of said membrane against said wall of said passage.

6. The lawnmower according to claim 5, wherein said switch is mounted on said clamping plate.

7. The lawnmower according to claim 6 further including a baffle projecting into said passage from said wall to form with said wall a zone of less cross section than said passage, said zone communicating said opening arrangement with said passage at a location downstream of said opening arrangement.

8. The lawnmower according to claim 1, wherein said opening arrangement comprises a plurality of small openings.

9. The lawnmower according to claim 1 further including a cover overlying said switch and said membrane.

10. The lawnmower according to claim 1, wherein said opening arrangement comprises a single large opening.

11. A lawnmower including:
    a cutting chamber and a rotary cutter blade therein;
    an air flow passage through which grass cuttings are discharged from said cutting chamber in a current of air;
    a collector connected to said passage for accumulating said grass cuttings; and a detector responsive to an air pressure condition within said passage wherein said air pressure condition changes a state of said detector under a predetermined pressure condition related to a fullness of said collector, said detector including:
  an elastic membrane covering an opening arrangement formed in a wall of said passage to communicate a first side of said membrane with pressure in said passage, said membrane bearing directly against an outer surface of said wall; and
  a switch including a sensing arm engageable with a second side of said membrane to be displaced in response to pressure-induced deflection of said membrane.

* * * * *